US011138550B1

(12) United States Patent
Fagan (10) Patent No.: US 11,138,550 B1
(45) Date of Patent: Oct. 5, 2021

(54) NO-TOUCH RETURN MAIL PROCESSING SYSTEM AND METHODS OF USE THEREOF

(71) Applicant: Broadridge Output Solutions, Inc., Newark, NJ (US)

(72) Inventor: Marc Fagan, Folsom, CA (US)

(73) Assignee: Broadridge Output Solutions, Inc., Newark, NJ (US)

( * ) Notice: Subject to any disclaimer, the term of this patent is extended or adjusted under 35 U.S.C. 154(b) by 0 days.

(21) Appl. No.: 16/736,635

(22) Filed: Jan. 7, 2020

Related U.S. Application Data

(60) Provisional application No. 62/789,376, filed on Jan. 7, 2019.

(51) Int. Cl.
*G06Q 10/08* (2012.01)

(52) U.S. Cl.
CPC .............................. *G06Q 10/0837* (2013.01)

(58) Field of Classification Search
CPC ................................................ G06Q 10/0837
USPC ......................................................... 705/340
See application file for complete search history.

(56) References Cited

U.S. PATENT DOCUMENTS

| 8,407,110 | B1* | 3/2013 | Joseph | ................. G06Q 10/087 705/26.1 |
| 2004/0125406 | A1* | 7/2004 | McManus | ........ G07B 17/00467 358/1.18 |
| 2008/0306884 | A1* | 12/2008 | Weinberg | .............. G06F 3/1217 705/410 |
| 2010/0230328 | A1* | 9/2010 | Bonnell | .................... B07C 3/18 209/584 |
| 2012/0116928 | A1* | 5/2012 | Gventer | ............. G06Q 10/0875 705/28 |

OTHER PUBLICATIONS

Koljonen, Juha, Glickman, Frederick; "Comparative Study of Artificial Intelligence Techniques as Applied to the Location of Address Blocks on Mail Pieces"; 1989 (Year: 1989).*

* cited by examiner

*Primary Examiner* — George Chen
*Assistant Examiner* — Dione N. Simpson
(74) *Attorney, Agent, or Firm* — Greenberg Traurig, LLP (57) ABSTRACT

In some embodiments, an illustrative no-touch mail processing system may include a return mail processor (RMP) computer programed to receive a print file request of a customer; wherein the print file request was utilized to print mail pieces based on a print file comprised within the print file request; an image processing machine at the RMP configured to associate, in a no-touch manner, a returned mail piece based on the print file from the customer and an identification indicia on the returned mail piece; and a return mail processing machine (RMPM) at the RMP configured to utilize other information, that is not visible on the returned mail piece or through a send window of the returned mail piece, to cause a returned mail activity to be performed, in the no-touch manner, with the returned mail piece in accordance to a rule of the customer.

7 Claims, 3 Drawing Sheets

NO-TOUCH RETURN MAIL PROCESSING SYSTEM AND METHODS OF USE THEREOF

CROSS-REFERENCE TO RELATED APPLICATIONS

This application claims priority from U.S. provisional application Ser. No. 62/789,376 filed on Jan. 7, 2019.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Field of Technology

This present disclosure pertains generally to a system and method for processing mail returned by the USPS in an automatic and no-touch manner. The subject technology allows return mail processors to handle returned mail even though they did not produce the original mailing associated with the returned mail.

2. Description of Related Art

The exemplary problem of the return mail handling is an acute problem for high-volume mailers in numerous industries, such as finance, insurance, healthcare, energy, telecommunications, government, and the like because many of these communications are, at least in some instances, critical to the sender's relationship with the recipient or subject to increasingly detailed federal regulations.

For example, as evidenced by a study of government mailings over the month of January 2017, which identified the root cause of 43% of UAA mail to be that the target address was "vacant". For example, the exemplary problem of the return mail lacking the target address requires time and research to correct, therefore, wasting operating resources of, for example, the return mail processors.

The typical four step process for carrying out such corrections is to: 1) inspect the face of the returned mail piece to extract information about the mail piece's identity, as well as any USPS messaging in reference to the return event; and then to 2) physically inspect the mail piece's contents, to extract information about the recipient such as an account number. Both sets of this "return mail event" information are then analyzed by the return mail processor to: 3) determine the proper response to the event and then 4) carry it out.

Since much return mail processing continues to be done manually, average costs are high, with estimates ranging from $1 to $3 per piece; worse, results can be slow in coming, increasing the risk of incurring additional costs in cases where problems are not corrected in a timely manner.

Typically, in cases when a recipient of the return mail pieces is also the original producer/manufacturer of such mail pieces, the problem of the return mail lacking the target address would be approached by, for example, 1) extracting data from the returned mail piece face, 2) correlating the extracted data against data from contents known to the original producer, 3) determining proper response (e.g., sorting by desired response type, etc.).

BRIEF SUMMARY

In some embodiments, the present description pertains generally to an exemplary no-touch returned mail processing system that may include a return mail processor (RMP) computer programed and controlled at a RMP to receive a print file request of a customer; where the print file request was utilized to print original mail pieces based on a print file comprised within the print file request; an image processing machine at the RMP configured to associate, in a no-touch manner, at least one returned mail piece based on the print file from the customer and at least one identification indicia on the at least one returned mail piece; and at least one return mail processing machine (RMPM) at the RMP configured to utilize other information, that is not visible on the at least one returned mail piece or through a send window of the at least one returned mail piece, to cause at least one returned mail activity to be performed, in the no-touch manner, with the at least one returned mail piece in accordance to at least one rule of the customer.

In some embodiments, the present description pertains generally to an exemplary no-touch returned mail processing method that may include: receiving, by a return mail processor (RMP) computer programed and controlled at a RMP, a print file request of a customer; where the print file request was utilized to print original mail pieces based on a print file comprised within the print file request; associating, by an image processing machine at the RMP, in a no-touch manner, at least one returned mail piece based on the print file from the customer and at least one identification indicia on the at least one returned mail piece; and utilizing, by at least one return mail processing machine (RMPM) at the RMP, other information, that is not visible on the at least one returned mail piece or through a send window of the at least one returned mail piece, to cause at least one returned mail activity to be performed, in the no-touch manner, with the at least one returned mail piece in accordance to at least one rule of the customer.

BRIEF DESCRIPTION OF THE SEVERAL VIEWS OF THE DRAWING(S)

The present disclosure will be more fully understood by reference to the following drawings which are for illustrative purposes only.

DETAILED DESCRIPTION OF THE PRESENT DISCLOSURE

Figure 1:
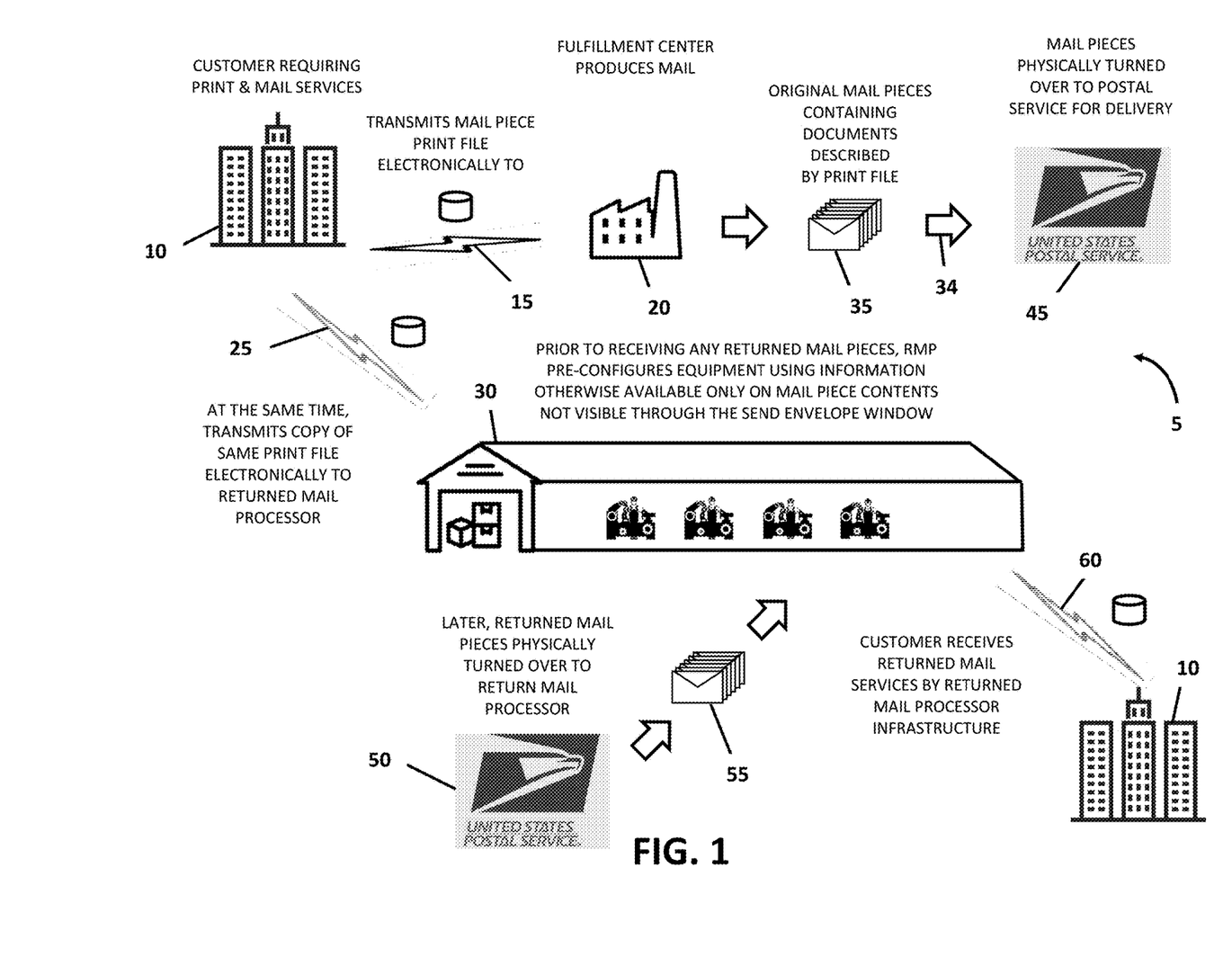
FIG. 1 shows a flow diagram for the various components in accordance with at least some embodiments of the present disclosure.
Figure 2:
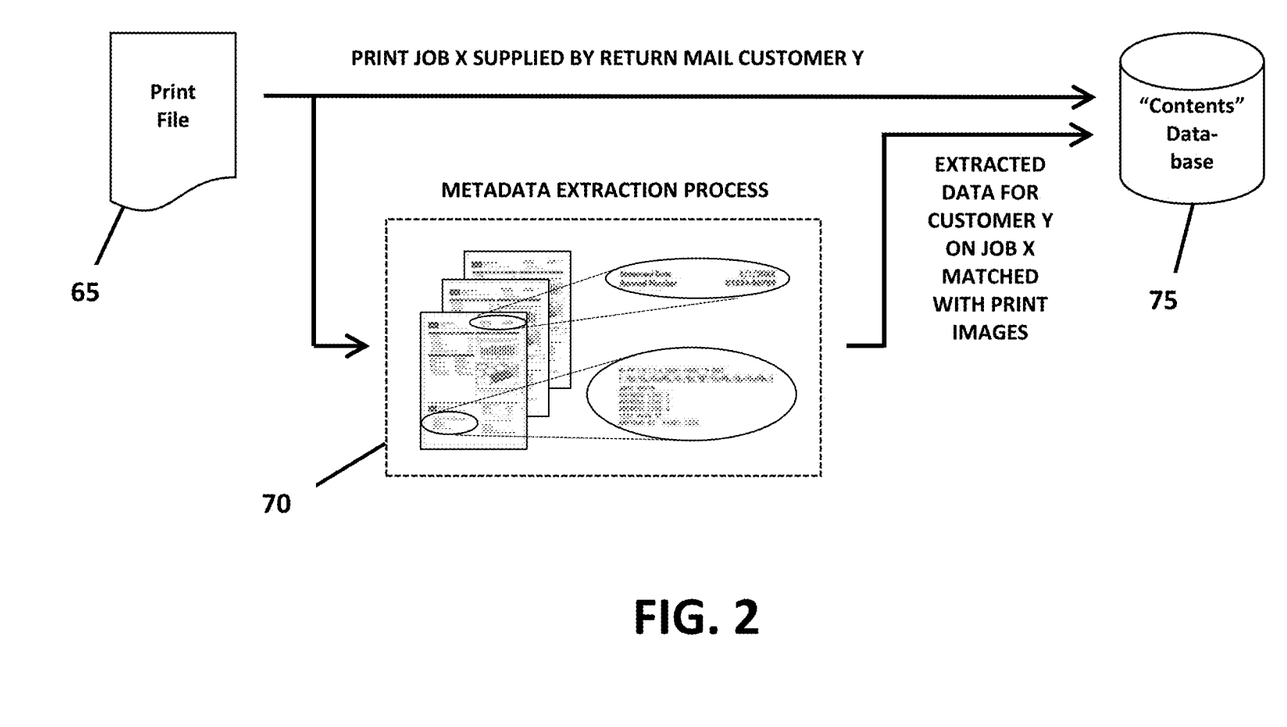
FIG. 2 shows a flow diagram of an exemplary processing in accordance with at least some embodiments of the present disclosure.
Figure 3:
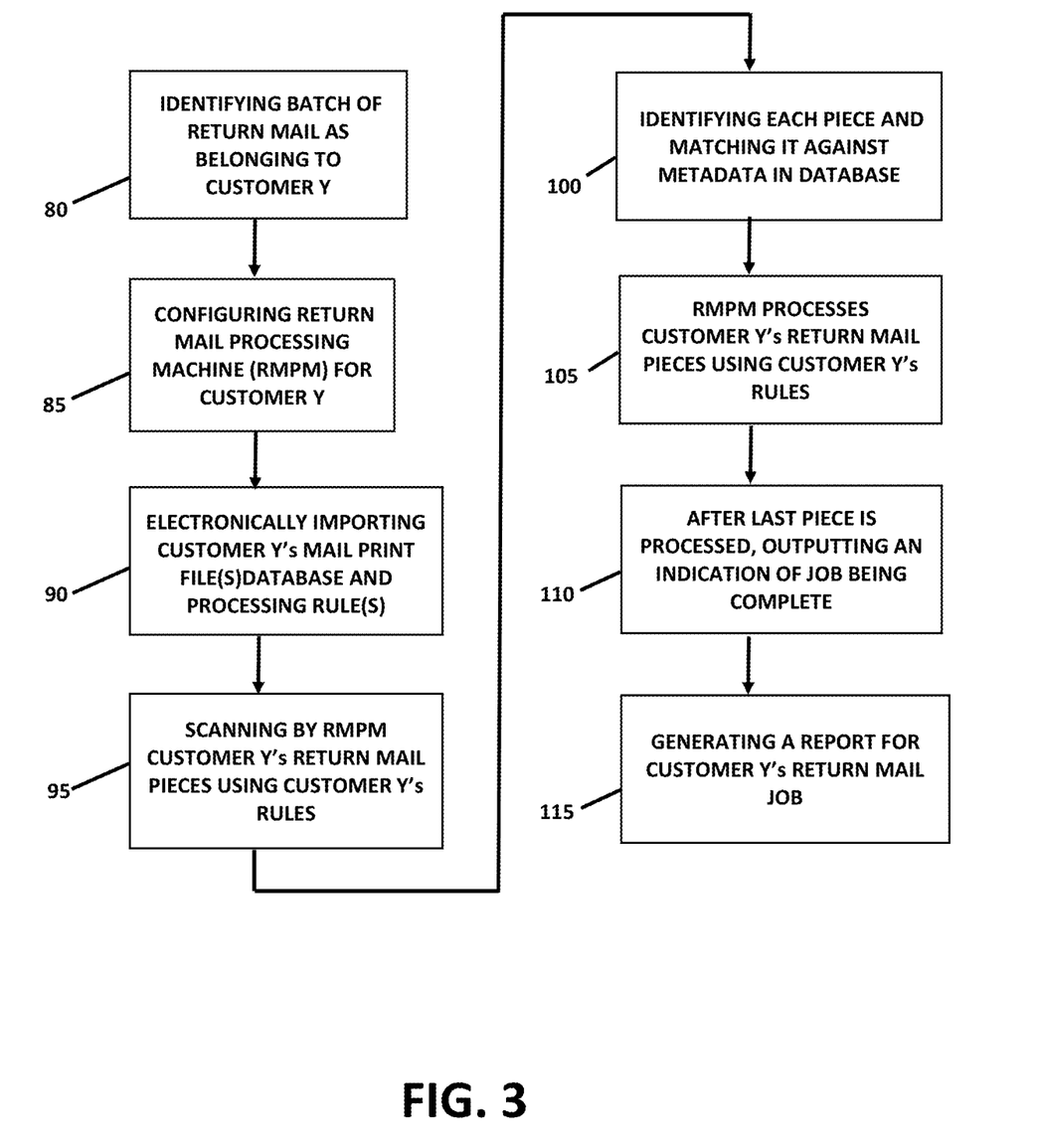
FIG. 3 shows a flow diagram for the various components in accordance with at least some embodiments of the present disclosure.

In some embodiments, an exemplary no-touch return mail processing system of the present disclosure may include an apparatus generally shown in FIG. 1 through FIG. 3. It will be appreciated that the exemplary no-touch return mail processing system of the present disclosure may vary as to configuration and as to details of the components, and any method described herein may vary as to the specific steps and/or a sequence of any steps is utilizing the exemplary no-touch return mail processing system of the present disclosure, without departing from the basic concepts as disclosed herein.

For example, in some embodiments, automated no-touch return mail processing system/equipment is/are configured, among other capabilities, to dynamically notify various entities (e.g., customers) associated with specific items of returned mail from one or more designated mailing address. In some embodiments, the exemplary no-touch return mail processing system/equipment of the present disclosure is/are configured, among other capabilities, to allow return mail processors to handle returned mail even though they did not produce the original mailing that has been returned (now called "returned mail") or the original mailing that is associated with the returned mail.

For example, in some embodiments, an exemplary no-touch return mail processing system and associated equipment of the present disclosure are configured to at least address, a problem of undeliverable-as-addressed (UAA) mail. Even though the volume of physical mail delivered by the US Postal Service (USPS) is declining, the volume of undeliverable-as-addressed (UAA) mail is rising and reached 4.56% of outbound volume in 2016 (Mailing Systems Technology, Jul. 6, 2017). Typically, the USPS requires that each of these returned mail pieces be forwarded, destroyed, or returned to its sender.

In some embodiments, an exemplary no-touch return mail processing system and associated equipment of the present disclosure are configured to assist return mail processors (RMPs) that are not the producer/manufacturer of the original mail pieces.

In some embodiments, the exemplary no-touch return mail processing system of the present disclosure is configured to have a metadata extraction step that enables an RMP to determine proper response(s) (e.g., sorting by desired response type, etc.) and/or carry out the determined response(s) without having to also be the original producer/manufacturer of the mail pieces.

In some embodiments, the exemplary no-touch return mail processing system of the present disclosure is configured to automatically extract the metadata, enabling both the RMP and the creator/producer/manufacturer of the original mail piece to process subsequent return mail runs without any human input.

In some embodiments, the exemplary no-touch return mail processing system of the present disclosure is configured to electronically receive a copy of the print file(s) for the mail run from electronic source(s) associated with the mail piece creator/producer/manufacturer. In some embodiments, the exemplary print file(s) is/are print file(s) that is/are used in creating the original mail pieces, and thus are available for distribution even before the original pieces are produced.

As used herein in at least some embodiments, the term "mail piece" may identify any mailable matter that is accepted for mail processing and delivery by U.S. Postal Service (e.g., a letter, flat, card, parcel, and the like).

Referring to FIG. 1, in some embodiments, the exemplary no-touch return mail processing system 5 of an exemplary RMP facility 30 is configured to electronically receive mail piece print file(s) 25 from a customer that requires print and mail services 10 and that also electronically transmits the mail piece print file(s) 15 to the fulfillment center (FC) 20 that the customer engages to create their postal compliant mail pieces. The mail pieces are then submitted for mailing to the USPS. In some embodiments, prior to receiving any physically returned mail pieces, the exemplary no-touch return mail processing system of the exemplary RMP 30 is configured to utilize information, provided in the transmitted mail piece print files, otherwise available only on mail piece contents not visible through a send envelope window or printed on a send envelope. In some embodiments, the exemplary RMP may destroy, return, or otherwise process the returned mail pieces (one or more return mail activities), depending on prior arrangements with the customer.

Having received the print files from the customer, the FC 20 then creates/produces/manufactures original postal compliant mail pieces described by the print files 35. The manufactured mail pieces are then delivered 34 to the USPS 45 for delivery to the addressed recipient.

Mail pieces that are not able to be delivered by the USPS, for various reasons, are returned to the USPS 50. The returned mail pieces are delivered 55 to the exemplary RMP 30 for handling according to prior instructions by the customer 10. Information concerning the fate of the mail pieces is then transmitted 60 to the customer. As noted above, the exemplary RMP 30 did not manufacture the mail pieces and only knows about each returned mail piece via the print files transmitted 25 to them and transmitted 15 to the FC 20.

Non-Limiting Examples of Illustrative Data Extraction Step

In some embodiments, mail production facilities (fulfillment centers or FCs) (e.g., item 20 of FIG. 1) may use a variety of industrial grade digital printers to produce paper mail, and such printers may support a variety of industry standard print file formats, such as, without limitation, AFP, PDF, PostScript, and the like.

In some embodiments, the exemplary no-touch return mail processing system of the present disclosure is configured to execute an exemplary automated metadata extraction process as generally described in FIG. 2. For example, the creator of the mail run, now designated as the Return Mail Customer (RMC), transmits a copy of the exemplary print file for a particular mail run to the FC (step 15 in FIG. 1) and the RMP (step 25 in FIG. 1). Since the print file must be created before the original mail pieces can be produced, it is reasonable to expect, in some embodiments, the file to be received by the RMP in plenty of time before any mail pieces from the job are returned.

In some embodiments, the exemplary print file may contain identifying information, for example without limitation, in the file name, denoting the particular RMC that sent it, as well as information uniquely identifying a job (i.e., a particular mail run), such as a job number or date and time. In some embodiments, the exemplary no-touch return mail processing system of the present disclosure is configured to use the identifying information in the print file 65 to determine the metadata extraction instruction(s) for that particular customer or job 70.

In some embodiments, the exemplary no-touch return mail processing system of the present disclosure is configured to use the extraction instructions 70 to convert the exemplary print file to a common format and then to obtain, for example, two different kinds of information: that which is visible from the face of the sealed mail piece, for example, without limitation, through a window in the envelope; and that which is not visible through the window.

In some embodiments, for example, during the period of time when an exemplary Return Mail Processor (RMP), utilizing the exemplary no-touch return mail processing system of the present disclosure, is onboarding a new client who desires RMP services, the exemplary RMP would receive at least one sample print job file from the prospective client, and, as detailed below, utilizes a computer running special software designed for this purpose, which includes a point-and-click Graphical User Interface, to examine electronic bitmap images of the documents described by the print file and to indicate the position and type of information to be extracted from each and stored in an exemplary database when subsequent "live" print jobs are delivered by the new client. In some embodiments, at the end of this setup process, the computer, running the special software designed for this purpose, stores the "extraction instructions 70" where they can be accessed subsequently as part of an exemplary automatic routine Metadata Extraction Process activity for the new client.

In some embodiments, as detailed above and below, the "extraction instructions 70" are created in an automated manner, without any computer coding or programming needing to be done by either the prospective client or the RMP, resulting in increased completing time for the entire setup process (e.g., 1 minutes to less than 5 days vs. at least a week.). For example, there is a technological problem that since a single Return Mail Customer may need RMP services for tens or even hundreds of different types of print jobs, it is far less costly and time consuming to create extraction instructions 70 in the automated fashion of the present disclosure, rather than hand-coding extraction instructions 70 manually for each type of print job.

In some embodiments, the exemplary no-touch return mail processing system of the present disclosure is configured to extract information that may include human readable information (e.g., printed address) and/or machine-readable information (e.g., barcode). In some embodiments, the exemplary no-touch return mail processing system of the present disclosure is configured to determine the extraction instructions 70 that may delineate not only which information is window versus non-window, but which is human-readable, machine-readable, or both.

In some embodiments, the exemplary no-touch return mail processing system of the present disclosure is configured to store all the information (e.g., extraction instructions 70, the extracted information, etc.) in an exemplary database 75. In some embodiments, the database 75 may be configured to store information about every mail piece in the print file, even though only a small fraction of the mail pieces is expected to be returned, because at the time the mail pieces are sent it is not possible to know which will be returned.

In some embodiments, the exemplary no-touch return mail processing system of the present disclosure is configured to set to identify a Return Mail Address, or RMA, as proscribed by the USPS, by, for example, being located in the upper left corner of the original mail pieces, and identify one or more parts of RMA that may specify a particular PO Box and a particular Post Office, for example: PO BOX 6789 ANYTOWN ST 12345-6789.

Thus, for example, when the USPS would deliver a batch of return mail to the RMP, it would be labeled as coming from, in this example, "Box 6789, ANYTOWN ST 12345-6789", which the RMP can then unambiguously associate with a particular RMC.

Non-Limiting Examples of Illustrative Return Mail Processing Step

As shown in FIG. 3, once a batch of return mail has been returned to the RMP, in some embodiments, the exemplary no-touch return mail processing system of the present disclosure and is configured to identify each returned mail piece 80 (by scanning said returned mail pieces for identifying indicia (bar code or other specific identifying markings) with a suitable apparatus such as, without limitation, a scanner, camera, and the like, configure 85 one or more return mail processing machines (RMPMs) (e.g., a high-speed letter sorter) with the job identification information for the RMC associated with Box 6789. In some embodiments, the exemplary RMPM is configured to access 90 the information stored previously in the metadata extraction step.

In some embodiments, the exemplary RMPM is configured to obtain one or more images (e.g., a machine for scanning, photographing, etc.) 95 of the face of each document as it is fed into the machine, and an exemplary image processing module of the present disclosure is configured to analyze each image according to one or more extraction instructions associated with the RMC for Box 6789.

In some embodiments, an exemplary extraction instruction may call out a particular methodology to be used for identifying a particular mail piece. In some embodiments, one or more extraction instructions from the RMC may instruct to use one or more machine-readable symbols to do the identification, and/or to use Multi-Line Optical Character Recognition (MLOCR) techniques to obtain a unique mailing address for the particular piece. In some embodiments, whichever identification methodology has been employed by the exemplary no-touch return mail processing system of the present disclosure 100, the extraction step carried out earlier will have stored the relevant information associated with that mail piece in the database.

For example, an exemplary extraction instruction may have instructed that a 14×14 2D DataMatrix barcode containing a specified field of data be used for matching the returned mail piece to the information from the mail print file. In some embodiments, when that the particular mail piece is processed as return mail, the exemplary machine will have been configured to look for a 14×14 2D DataMatrix symbol, and upon decoding it, will find the matching information associated with the mail piece in the database position corresponding to the decoded data.

In some embodiments, once the matching is successful, the relevant information from the mail piece contents can be accessed and the exemplary no-touch return mail processing system of the present disclosure is configured to cause disposition instruction(s) to be carried out 105. For example, in some embodiments, each mail piece can be immediately sorted to a particular pocket of the machine (e.g., the sorter) associated with the desired disposition and after the last mail piece is processed by the exemplary machine, the job is complete 110.

In some embodiments, the exemplary no-touch return mail processing system of the present disclosure is configured to store the results of the return mail job in the database and/or share 115 with the Return Mail Customer in an end result report. In some embodiments, the exemplary no-touch return mail processing system of the present disclosure is configured to cause a physical downstream processing of the sorted returned mail pieces in accordance one or more additional instructions (e.g., instructions from the RMC).

In some embodiments, the exemplary no-touch return mail processing system of the present disclosure is configured to perform at least the following steps: 1) extract data from mail piece face, 2) match the extracted data against data from content of respective mail piece, 3) determine proper response, and 4) execute or cause to execute a desired action (e.g., sorting by desired response type, etc.).

New Return Mail Client Setup Step

In some embodiments, the exemplary no-touch return mail processing system of the present disclosure is configured to generate/provide, for example, a point-and-click Graphical User Interface that is specifically programmed to allow its user to use sample print jobs from the prospective client to identify areas of interest and associate each with its purpose to create a database with instructions for processing future jobs of the same type. For example, one area may be designated as send address; another as a 14×14 2D Data-Matrix barcode, another as an Account ID. In some embodiments, the exemplary no-touch return mail processing system of the present disclosure is configured to receive from the user parameters for how a document should be "scraped" for metadata, and stores the results as "recipe(s)" for processing future jobs of the same type.

In some embodiments, the exemplary no-touch return mail processing system of the present disclosure is configured to provide to the user an upfront questionnaire that "interviews" the user to acquire answers through, for example without limitation, the use of a question tree, creating, in parallel, a list of checkboxes that need to be accounted for through the subsequent area-of-interest point-and-click design session. In some embodiments, once all of the boxes are accounted for, the exemplary no-touch return mail processing system of the present disclosure is configured to execute a error-checking process, ensuring that the particular set of metadata extraction instructions is ready for use on "live" data.

In some embodiments, the exemplary no-touch return mail processing system of the present disclosure is configured to provide technological solutions for at least three steps: 1) the Onboarding step, which is only carried out once per job type per client; 2) the metadata extraction step, which is carried out once per job; and 3) the automated high-speed return mail processing step, which is also carried out once per job.

Embodiments of the present disclosure may be described with reference to equations, algorithms, and/or flowchart illustrations of methods according to embodiments of the present disclosure. These methods may be implemented using specialized computer program instructions executable on a computer. These methods may also be implemented as computer program products either separately, or as a component of an apparatus or system. In this regard, each equation, algorithm, or block or step of a flowchart, and combinations thereof, may be implemented by various means, such as hardware, firmware, and/or software including one or more specialized computer program instructions embodied in computer-readable program code logic. As will be appreciated, any such specialized computer program instructions may be loaded onto a computer and executed by various types of computing processors (e.g., CPU, GPU, and others).

More specifically, the subject technology comprises a initial embodiment for processing mail that includes: a first computer programed and controlled to transmit a customer's print file request to both a fulfillment center (FC) and a return mail processor (RMP); a second computer programed and controlled at the FC to receive the print file request; a printer at the FC that utilizes the print file request to print mail pieces found within the print file, wherein the mail pieces are delivered to the USPS for mailing; a third computer programed and controlled at the RMP to receive the print file request and process any returned mail pieces resulting from the mail pieces found within the print file; an image processing machine at the RMP for identifying any returned mail piece from the customer based on the print file received by the third computer, whereas the third computer utilizes identification indicia on returned mail pieces for the identification and processing; and at least one return mail processing machine (RMPM) at the RMP pre-configured with information not visible on a send mail envelope or through a send envelope window in the mail pieces to process the returned mail pieces found within print file.

Additional embodiments include a mail processing system, wherein each mail piece is matched by the third computer against metadata found within the print file and the RMPM processes the customer's returned mail pieces using rules set by the customer.

A further embodiment of the subject mail processing system envisions that the return mail processing includes performance of one or more return mail activities such as, without limitation, either destroying or returning the returned mail to the customer and generating a returned mail piece end result report (for example, by the third computer) for the customer. Additionally, the FC and the RMP are different entities and at different physical locations.

A method embodiment embraces: transmitting by a suitably programed and controlled first computer a customer's print file request to both a fulfillment center (FC) and a return mail processor (RMP); receiving the print file request by a second computer programed and controlled at the FC; printing mail pieces found within the print file a printer at the FC, wherein the mail pieces are delivered to the USPS for mailing; receiving the print file request by a third computer programed and controlled at the RMP and processing any returned mail pieces resulting from the mail pieces found within the print file; identifying any the returned mail pieces by employing an image processing machine at the RMP, wherein the identifying of any returned mail piece from the customer is based on the print file received by the third computer, whereas the third computer utilizes identification indicia on the returned mail pieces for the identification and further processing; and processing the returned mail pieces by at least one return mail processing machine (RMPM) at the RMP that pre-configured with information not visible on a send mail envelope or through a send envelope window in the mail piece to process the returned mail pieces found within the print file.

Further method embodiments include methods, wherein each the mail piece is matched by the third computer against metadata found within the print file and the RMPM processes the customer's the returned mail pieces using rules set by the customer, or wherein the return mail processing includes either destroying or returning the returned mail to the customer, or wherein the return mail processing generates a returned mail piece end result report by the third computer for the customer.

Accordingly, the equations, algorithms, and/or flowcharts support combinations of means for performing the specified functions, combinations of steps for performing the specified functions, and computer program instructions, such as embodied in computer-readable program code logic means, for performing the specified functions. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the equation(s), algorithm(s), and/or block(s) of the flowchart(s).

In some embodiments, the present description pertains generally to an exemplary no-touch returned mail processing system that may include a return mail processor (RMP) computer programed and controlled at a RMP to receive a print file request of a customer; where the print file request was utilized to print original mail pieces based on a print file comprised within the print file request; an image processing machine at the RMP configured to associate, in a no-touch manner, at least one returned mail piece based on the print file from the customer and at least one identification indicia on the at least one returned mail piece; and at least one return mail processing machine (RMPM) at the RMP configured to utilize other information, that is not visible on the at least one returned mail piece or through a send window of the at least one returned mail piece, to cause at least one returned mail activity to be performed, in the no-touch manner, with the at least one returned mail piece in accordance to at least one rule of the customer.

In some embodiments, the present description pertains generally to an exemplary no-touch returned mail processing method that may include: receiving, by a return mail processor (RMP) computer programed and controlled at a RMP, a print file request of a customer; where the print file request was utilized to print original mail pieces based on a print file comprised within the print file request; associating, by an image processing machine at the RMP, in a no-touch manner, at least one returned mail piece based on the print file from the customer and at least one identification indicia on the at least one returned mail piece; and utilizing, by at least one return mail processing machine (RMPM) at the RMP, other information, that is not visible on the at least one returned mail piece or through a send window of the at least one returned mail piece, to cause at least one returned mail activity to be performed, in the no-touch manner, with the at least one returned mail piece in accordance to at least one rule of the customer.

In some embodiments, the at least one returned mail activity is one of destroying the at least one returned mail piece or returning the at least one returned mail piece to the customer.

In some embodiments, the at least one returned mail activity is to generate a returned mail piece end result report for the customer by the RMPM.

In some embodiments, the print file of the customer comprises metadata that comprises the other information.

In some embodiments, the print file request was also sent to a fulfillment center (FC) computer and was utilized to: print the original mail pieces based on the print file and deliver the original mail pieces to a postal service for mailing the original mail pieces.

In some embodiments, the FC and the RMP are different entities.

In some embodiments, an exemplary no-touch system of processing mail may include: a first computer programed and controlled to transmit a customer's print file request to both a fulfillment center (FC) and a return mail processor (RMP); a second computer programed and controlled at said FC to receive said print file request; a printer at said FC that utilizes said print file request to print mail items found within said print file, where said mail items are delivered to the USPS for mailing; a third computer programed and controlled at said RMP to receive said print file request and process any said returned mail items resulting from said mail items found within said print file; an image processing machine at said RMP for identifying any said returned mail item from said customer based on said print file received by said third computer, whereas said third computer utilizes identification indicia on returned mail items for said identification and processing; and at least one return mail processing machine (RMPM) at said RMP pre-configured with information not visible on a send mail envelope or through a send envelope window in said mail item to process said returned mail items found within said print file.

In some embodiments, each said mail piece is matched by said third computer against metadata found within said print file and said RMPM processes said customer's said returned mail items using rules set by said customer.

In some embodiments, said return mail processing includes either destroying or returning said returned mail to said customer.

In some embodiments, said return mail processing generates a returned mail item end result report by said third computer for said customer.

In some embodiments, an exemplary no-touch system of processing mail may include: a first computer programed and controlled to transmit a customer's print file request to both a fulfillment center (FC) and a return mail processor (RMP); a second computer programed and controlled at said FC to receive said print file request; a printer at said FC that utilizes said print file request to print mail items found within said print file, where said mail items are delivered to the USPS for mailing; a third computer programed and controlled at said RMP to receive said print file request and process any said returned mail items resulting from said mail items found within said print file; an image processing machine at said RMP for identifying any said returned mail item from said customer based on said print file received by said third computer, whereas said third computer utilizes identification indicia on returned mail items for said identification and processing; and at least one return mail processing machine (RMPM) at said RMP pre-configured with information not visible on a send mail envelope or through a send envelope window in said mail item to process said returned mail items found within said print file, where said return mail processing includes either destroying or returning said returned mail to said customer.

In some embodiments, each said mail piece is matched by said third computer against metadata found within said print file and said RMPM processes said customer's said returned mail items using rules set by said customer.

In some embodiments, an exemplary no-touch method of processing mail may include: transmitting by a suitably programed and controlled first computer a customer's print file request to both a fulfillment center (FC) and a return mail processor (RMP); receiving said print file request by a second computer programed and controlled at said FC; printing mail items found within said print file a printer at said FC, where said mail items are delivered to the USPS for mailing; receiving said print file request by a third computer programed and controlled at said RMP and processing any said returned mail items resulting from said mail items found within said print file; identifying any said returned mail items by employing an image processing machine at said RMP, where said identifying of any said returned mail item from said customer is based on said print file received by said third computer, whereas said third computer utilizes identification indicia on said returned mail items for said identification and further processing; and processing said returned mail items by at least one return mail processing machine (RMPM) at said RMP that pre-configured with information not visible on a send mail envelope or through a send envelope window in said mail item to process said returned mail items found within said print file.

In some embodiments, each said mail piece is matched by said third computer against metadata found within said print file and said RMPM processes said customer's said returned mail items using rules set by said customer.

In some embodiments, said return mail processing includes either destroying or returning said returned mail to said customer.

Although the description above contains many details, these should not be construed as limiting the scope of the present disclosure but as merely providing illustrations of some of the presently embodiments of this present disclosure. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A no-touch returned mail processing system comprising:
   a return mail processor (RMP) computer programed and controlled at a RMP to receive a print file request of a customer;
   wherein the print file request was utilized to print original mail pieces based on a print file comprised within the print file request;
   wherein the print file request was also sent to a fulfillment center (FC) computer and was configured to:
   print the original mail pieces based on the print file and deliver the original mail pieces to a postal service for mailing the original mail pieces;
   an image processing machine at the RMP configured to associate, in a no-touch manner and based on the print file from the customer, non-visible content within at least one returned mail piece with at least one identification indicia on the at least one returned mail piece;
   wherein the non-visible content is
      i) contained within the at least one returned mail piece and
      ii) not visible on the at least one returned mail piece or through a send window of the at least one returned mail piece; and
   at least one return mail processing machine (RMPM) at the RMP configured to perform at least one returned mail activity, in the no-touch manner, with the at least one returned mail piece based on:
      i) the non-visible content and
      ii) at least one rule of the customer;
   wherein the at least one returned mail activity is one of destroying the at least one returned mail piece or returning the at least one returned mail piece to the customer.

2. The no-touch returned mail processing system of claim 1, wherein the at least one returned mail activity is to generate a returned mail piece end result report for the customer by the RMPM.

3. The no-touch returned mail processing system of claim 1, wherein the FC and the RMP are different entities.

4. A no-touch returned mail processing method comprising:
   receiving, by a return mail processor (RMP) computer programed and controlled at a RMP, a print file request of a customer;
      wherein the print file request was utilized to print original mail pieces based on a print file comprised within the print file request;
      wherein the print file request was also sent to a fulfillment center (FC) computer and was configured to:
      print the original mail pieces based on the print file and deliver the original mail pieces to a postal service for mailing the original mail pieces;
   associating, by an image processing machine at the RMP and based on the print file from the customer, in a no-touch manner; non-visible content within at least one returned mail piece with at least one identification indicia on the at least one returned mail piece; and
   wherein the non-visible content is
      i) contained within the at least one returned mail piece and
      ii) not visible on the at least one returned mail piece or through a send window of the at least one returned mail piece; and
   performing, by at least one return mail processing machine (RMPM) at the RMP, at least one returned mail activity, in the no-touch manner, with the at least one returned mail piece based on:
      i) the non-visible content and
      ii) at least one rule of the customer wherein the at least one returned mail activity is one of destroying the at least one returned mail piece or returning the at least one returned mail piece to the customer.

5. The no-touch returned mail processing method of claim 4, wherein the at least one returned mail activity is to generate a returned mail piece end result report for the customer by the RMPM.

6. The no-touch returned mail processing method of claim 4, wherein the associating comprises: matching, in the no-touch manner, the at least one returned mail piece to the print file of the customer based the at least one identification indicia on the at least one returned mail piece.

7. The no-touch returned mail processing method of claim 4, wherein the FC and the RMP are different entities.

* * * * *